(12) United States Patent
Lee et al.

(10) Patent No.: US 8,744,146 B2
(45) Date of Patent: Jun. 3, 2014

(54) VASCULAR REFORMATTING USING CURVED PLANAR REFORMATION

(75) Inventors: Noah Lee, Berlin (DE); Matthias Rasch, Ewing, NJ (US)

(73) Assignee: Siemens Aktiengellschaft, Munich (DE)

( * ) Notice: Subject to any disclaimer, the term of this patent is extended or adjusted under 35 U.S.C. 154(b) by 1855 days.

(21) Appl. No.: 11/224,203

(22) Filed: Sep. 12, 2005

(65) Prior Publication Data

US 2006/0122539 A1 Jun. 8, 2006

Related U.S. Application Data

(60) Provisional application No. 60/633,493, filed on Dec. 6, 2004.

(51) Int. Cl.
*G06K 9/00* (2006.01)

(52) U.S. Cl.
USPC ........... 382/128; 328/100; 328/130; 328/131; 328/132; 328/276; 345/419; 345/424; 345/585; 128/922

(58) Field of Classification Search
USPC ......... 382/128, 131, 100, 288, 130, 132, 276; 128/922; 345/419, 424, 585
See application file for complete search history.

(56) References Cited

U.S. PATENT DOCUMENTS 6,501,848 B1 * 12/2002 Carroll et al. ................. 382/128
2007/0201737 A1 * 8/2007 Cai .............................. 382/131

FOREIGN PATENT DOCUMENTS

WO WO 2005048198 A1 * 5/2005 .............. G06T 17/40

OTHER PUBLICATIONS

Kanitsar, A.; Fleischmann, D.; Wegenkittl, R.; Felkel, P.; Grolier, E.; CPR—curved planar reformation. Visualization, 2002. VIS 2002. IEEE Oct. 27-Nov. 1, 2002, pp. 37-44.*
Kanitsar, A.; Wegenkittl, R.; Fleischmann, D.; Grolier, M.E.;Advanced curved planar reformation: flattening of vascular structures. Visualization, 2003. VIS 2003. IEEE Oct. 19-24 pp. 43-50.*
Saroul, L.; Gerlach, S.; Herch, R.D.; Exploring curved anatomic structures with surface sections. Visualization, 2003. VIS 2003. IEEE Oct. 19-24, 2003 pp. 27-34.*
Raghav Raman et al. Automated Generation of Curved Planar Reformations from Volume Data: Method and Evaluation. Radiology 2002. Published online before print Mar. 1, 2002, pp. 275-280.*
Kanitsar, A.; Fleischmann, D.; Wegenkittl, R.; Sandner, D.; Felkel, P.; Groller, E.; "Computed tomography angiography: a case study of peripheral vessel investigation". Visualization, 2001. VIS '01. Proceedings Oct. 21-26, 2001 pp. 477-593.*
Chen, S.J.; Carroll, J.D.; "3-D reconstruction of coronary arterial tree to optimize angiographic visualization". Medical Imaging, IEEE Transactions on Apr. 2000, vol. 19, Issue 4, pp. 318-336.*

(Continued)

*Primary Examiner* — Matthew Bella
*Assistant Examiner* — Julian Brooks

(57) ABSTRACT

A method for curved planar reformation of an image includes receiving a data volume including a medial axis tree of a vessel tree, determining a global rotation axis of the medial axis tree, and casting a line segment from a vessel tree root of the medial axis tree into a predefined direction perpendicular to the global rotation axis. The method includes projecting the medial axis tree onto a reference plane along the line segment. The method further includes re-sampling, from at least one medial axis point of a reference plane, the data volume using a vector perpendicular to a medial axis tangent of the reference plane, wherein the vector defines a sampling direction. The method includes rendering an image of the vessel tree along the vector.

16 Claims, 5 Drawing Sheets

(56) References Cited

OTHER PUBLICATIONS

Fessler, J.; Nishimura, D.; Macovski, A.; "Model-based 3-D reconstruction of branching vessels". Engineering in Medicine and Biology Society, 1989. Images of the Twenty-First Century., Proceedings of the Annual International Conference of the IEEE Engineering in Nov. 9-12, 1989, vol. 2, pp. 561-562.*

* cited by examiner

VASCULAR REFORMATTING USING CURVED PLANAR REFORMATION

This application claims priority to U.S. Provisional Application Ser. No. 60/633,493, filed on Dec. 6, 2004, which is herein incorporated by reference in its entirety.

BACKGROUND OF THE INVENTION

1. Technical Field

The present invention relates to medical imaging, and more particularly to a system and method for reformatting medical images using a curved planar reformation.

2. Discussion of Related Art

Vascular visualization of medical image data provides valuable information about vessel anatomy and pathology. Vessel structures, exterior and interior, can be difficult to investigate with current visualization techniques, e.g., multi-planar reconstructions (MPRs), curved MPRs, or volume rendering (VR). Manual creation of curved MPRs can be tedious and time consuming. Other methods for automatic generation of curved planar reformations only consider individual vessel segments. Visualization techniques for whole tree structures have been proposed, but these methods are not flexible enough to handle arbitrary vessel topologies and orientations.

Therefore, a need exists for a method for visualization of vascular structures using a reformatted medial axis.

SUMMARY OF THE INVENTION

According to an embodiment of the present disclosure a computer-implemented method for curved planar reformation of an image includes receiving a data volume including a medial axis tree of a vessel tree, determining a global rotation axis of the medial axis tree, and casting a line segment from a vessel tree root of the medial axis tree into a predefined direction perpendicular to the global rotation axis. The method includes projecting the medial axis tree onto a reference plane along the line segment. The method further includes re-sampling, from at least one medial axis point of a reference plane, the data volume using a vector perpendicular to a medial axis tangent of the reference plane, wherein the vector defines a sampling direction. The method includes rendering an image of the vessel tree along the vector.

Determining a global rotation axis further comprises determining a center of gravity of the medial axis tree, wherein the global rotation axis passes through the center of gravity and the vessel tree root of the medial axis tree.

Projecting further includes determining values for each x-coordinate of the reference plane as a distance from a respective centerline point of the medial axis tree to the reference plane, and determining values for each y-coordinate of the reference plane as an absolute travel distance to the vessel tree root measured along the medial axes tree.

Rendering further includes a partitioning of the projected medial axis tree along a plurality of parallel scan lines.

The computer-implemented method includes assigning a partition between each medial axis in the reference plane, the partition having an edge defined as an edge of the reference plane.

The computer-implemented method includes assigning a partition between each medial axis in the reference plane, the partition having an edge defined as a center point of a medial axis. Each partition comprises a plurality of line sections, each line section being filled with voxel data obtained by scanning along a vector around an assigned line section.

A length of the line segment is determined as a maximum distance among all medial axis tree points to the global rotation axis.

According to an embodiment of the present disclosure, a program storage device is provided, readable by machine, tangibly embodying a program of instructions executable by the machine to perform method steps for curved planar reformation of an image. The method includes receiving a data volume including a medial axis tree of a vessel tree, determining a global rotation axis of the medial axis tree, and casting a line segment from a vessel tree root of the medial axis tree into a predefined direction perpendicular to the global rotation axis. The method includes projecting the medial axis tree onto a reference plane along the line segment. The method further includes re-sampling, from at least one medial axis point of a reference plane, the data volume using a vector perpendicular to a medial axis tangent of the reference plane, wherein the vector defines a sampling direction. The method includes rendering an image of the vessel tree along the vector.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 2:
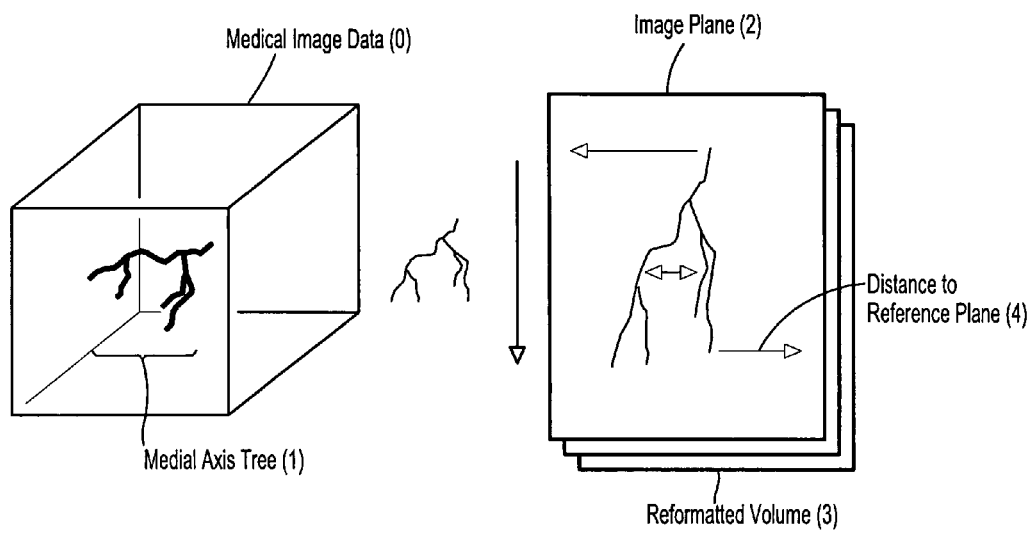
FIG. 2 is an illustration of a transformation from medical image data to a reformatted volume according to an embodiment of the present disclosure.

According to an embodiment of the present disclosure, a system and method for a curved planar reformation is augmented using a modified reformation technique. The method enables the visualizing of a vessel tree lumen in a global image. The method assumes the availability of high-level vascular image data (0) including a medial axis of the vessel tree (1) (see for example, FIG. 2). The image data (0) is input as a volume of axial sections having an arbitrary rotation.

Figure 1:
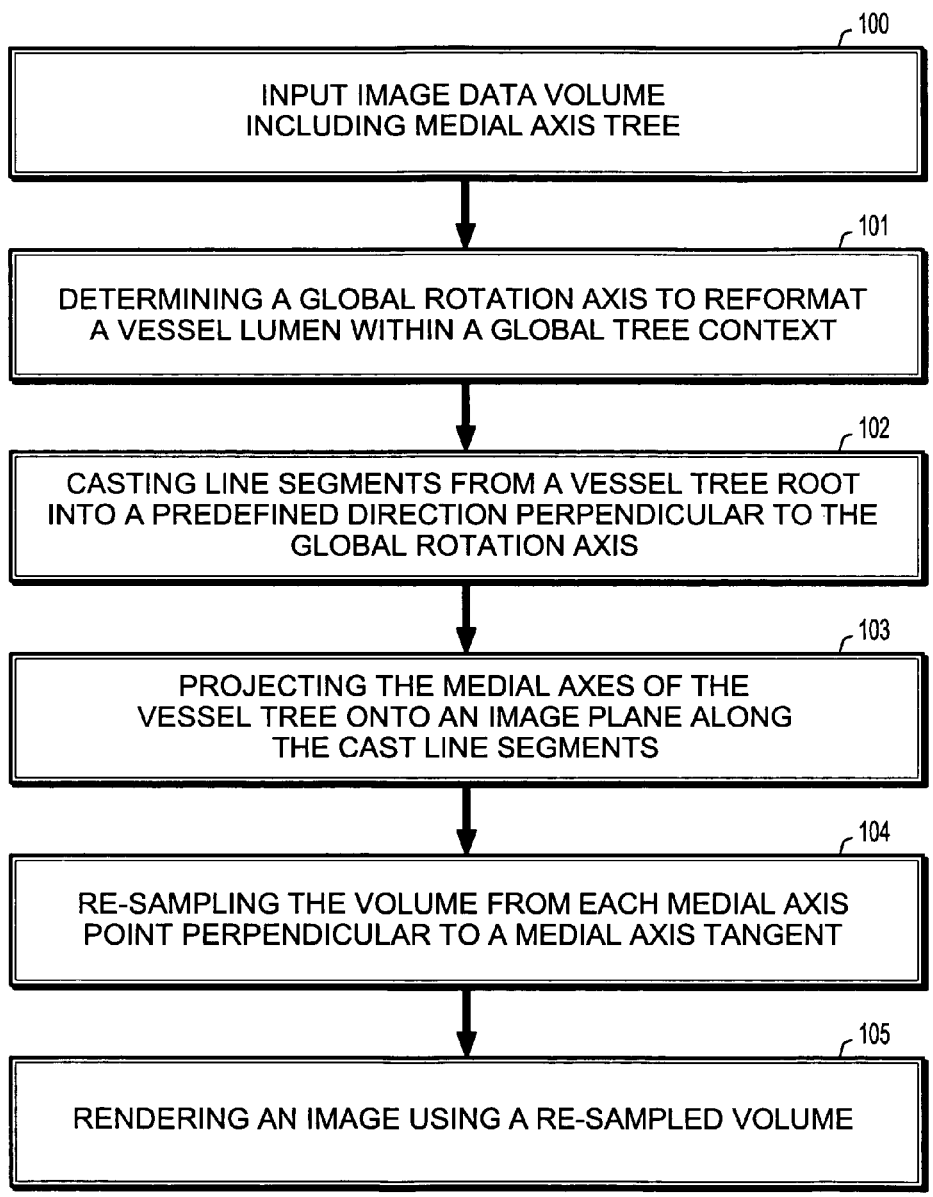
FIG. 1 is a flow chart of a method according to an embodiment of the present disclosure.
Figure 3:
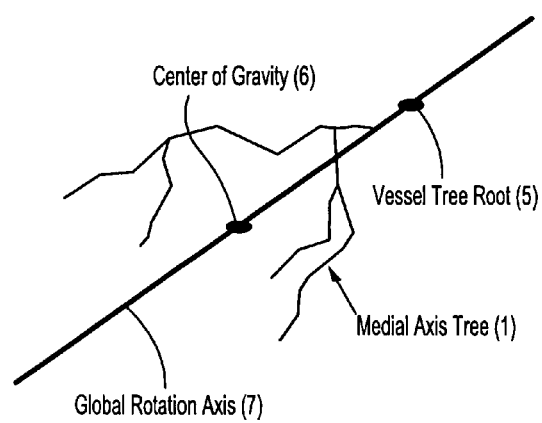
FIG. 3 shows a global rotation axis defined through a center of gravity and a tree root according to an embodiment of the present disclosure.

Referring to FIG. 1, a global rotation axis (7) is determined to reformat the vessel lumen within a global tree context 101 (see for example, FIG. 3). The global rotation axis (7) is determined as passing through a center of gravity of the medial axis tree (6) and a vessel tree root (8).

The center of gravity (6) is determined as the sum of all points of the medial axis tree (1) divided by the total number of points. The center of gravity (6) may be determined by other methods known to one of ordinary skill in the art. The vessel tree root (5) is given by segmentation hardware/software, which provides the vessel lumen input (0).

Figure 4:
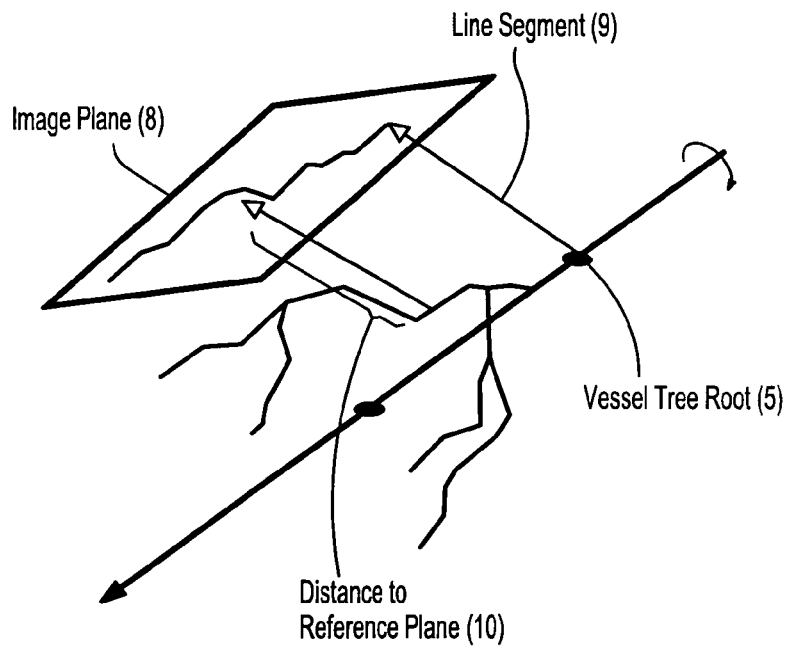
FIG. 4 is an illustration of a reference plane and associated line segments and their distances according to an embodiment of the present disclosure.

Referring to FIG. 4, from the vessel tree root (5) a line segment (9) is cast in a predefined direction, e.g., as determined by a user defined rotation, perpendicular to the global rotation axis 102. The length of the line segment is determined according to a maximum distance among all medial axis tree points to the global rotation axis (7); a reference plane is disposed at least as far from the global rotation axis (7) as the farthest point of the medial axis tree (1). The line segment is a projection of the medial axis of the vessel tree (1) onto a reference plane (8) 103. The reference plane distance may be extended beyond the maximum distance. X-coordinates are determined as the distance (4)/(10) from each centerline point of the medial axis tree (1) to the reference plane (8). The y-coordinates are determined as an absolute travel distance to the root element (5) measured along the vessel medial axes. This preserves the original vessel length information in an output image. A plurality of the medial axis trees at different rotations comprise the reformatted volume (3).

Figure 5:
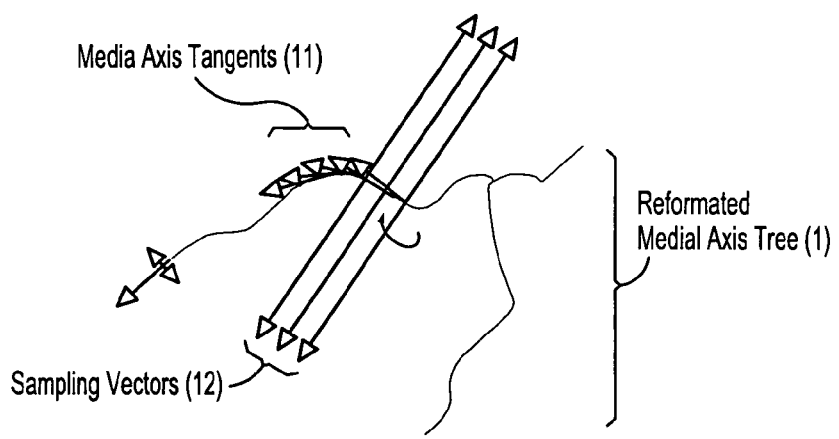
FIG. 5 is a drawing of medial axis tangents on each medial axis point and their perpendicular sampling vectors according to an embodiment of the present disclosure.

Referring to FIG. 5, from each medial axis point the volume of the image data is re-sampled using a vector (12) that is perpendicular to the medial axis tangent (11) of the reference plane 104 (see FIG. 5). The vector (12) defines the sampling direction and substantially prevents sampling artifacts in the vessel lumen area. Using re-sampled information, a two-dimensional image of the vessel tree lumen, a longitudinal cross-section through the vessel tree, is rendered 105 at a given rotation around the global rotation axis (7).

Figure 6:
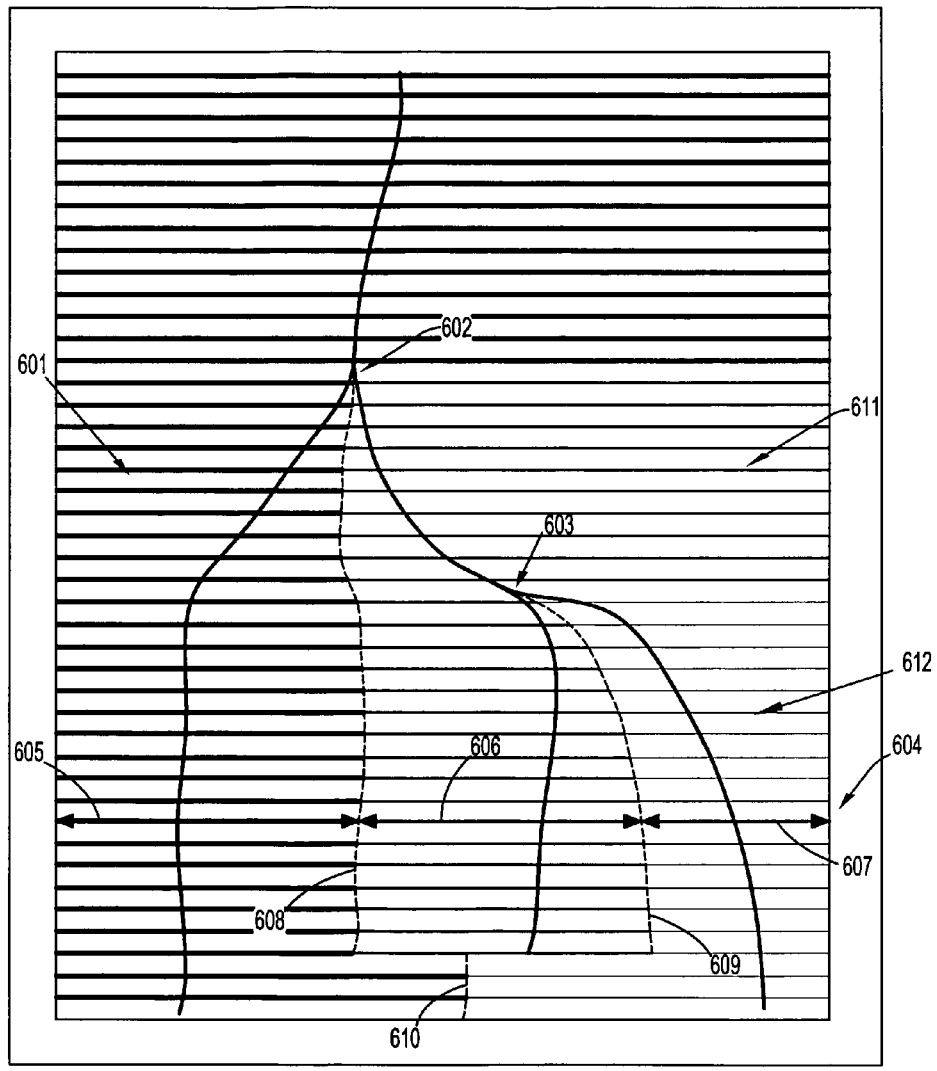
FIG. 6 is an illustration of a partitioning of an image of a vessel tree according to an embodiment of the present disclosure.

Referring to FIG. 6, for the rendering 105, the image is partitioned by medial axes in a way that assigns image areas, e.g., 601, to a respective vessel centerline. For example, in the case of a first area 601 no medial axis is found in approximately the first third of the reference plane down from the vessel tree root. A first medial axis 608 extends from a first branch 602 from the root, bifurcating the area between vessel tree branches and separating the reference plane into the first area 601 and a second area 611. The first area 601 is assigned to the vessel centerline extending from the vessel tree root down the left vessel centerline. The second area 611 is assigned to a vessel centerline extending from the first branch 602, down a right vessel centerline to a second branch 603. A second medial axis 609 extends from the second branch 603, forming a third area 612. Thus, the second area 611 is also assigned to the vessel centerline extending from the second branch 603 down a left vessel centerline. A third medial axis 610 extends from a scan line where a middle branch of the vessel tree terminates to an end of the reference plane, separating the first area 601 and the third area 612. The third area 612 is assigned the vessel centerline extending from the second branch 603 down a right vessel centerline.

Each scan line includes one or more sections in the resulting image that are assigned an area. Each area is disposed between adjacent projected medial axes. For a medial axis that does not have a neighboring medial axis along a given scan line, an edge of the area is the edge of the volume or image data. Each medial axis is disposed at a center point between respective branches of the vessel centerline tree, along a plurality of scan lines. For example, a scan line 604 is split into three line sections (605-607) corresponding to respective areas 601, 611 and 612, the scan line 604 being partitioned by two medial axes 608 and 609 intersecting the scan line 604. Each resulting line section is filled with voxel data obtained by scanning along the vector (12) around the axis section closest to it.

The vessel centerline tree is shown in FIG. 6 for purposes a describing a system and method for reformatting a provided medial axis tree; the vessel centerline tree may not be rendered.

According to an embodiment of the present description, a method for curved planar image reformatting is immune against arbitrary vessel topologies.

Due to rounding errors in the discrete image domain, an additional sampling check is performed to determine the ordering of the rendering for each transformed medial axis point. To visualize the whole vessel tree lumen the sampling vectors can be rotated around respective medial axis tangents, for example, as defined by a user input. Thus, for any overlap of medial axes, a top most medial axis is considered for determining a visualization of the vessel tree lumen; depth information is known according to the line casting, for example, the top most medial axis will have the smallest distance to the reference plane. The visualization of the vessel tree lumen may be determined in real time according to the user input, e.g., rotation of the medial axis tree. The visualizations may be predetermined and stored for later retrieval.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 7:
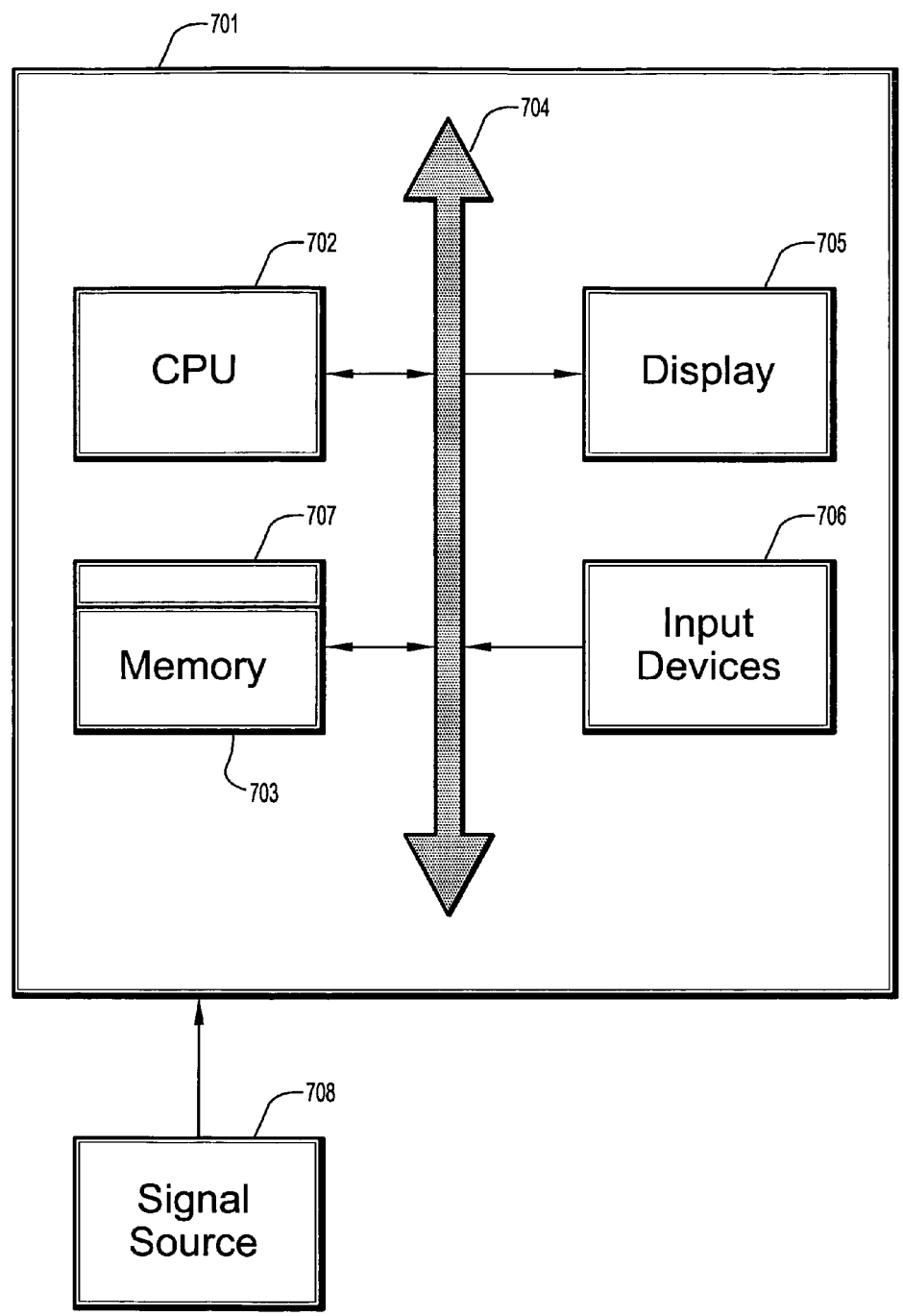
FIG. 7 is a diagram of a system according to an embodiment of the present disclosure.

Referring to FIG. 7, according to an embodiment of the present invention, a computer system 701 for implementing a method of curved planar reformation of image data comprises, inter alia, a central processing unit (CPU) 702, a memory 703 and an input/output (I/O) interface 704. The computer system 701 is generally coupled through the I/O interface 704 to a display 705 and various input devices 706 such as a mouse and keyboard. The support circuits can include circuits such as cache, power supplies, clock circuits, and a communications bus. The memory 703 can include random access memory (RAM), read only memory (ROM), disk drive, tape drive, etc., or a combination thereof. The present invention can be implemented as a routine 707 that is stored in memory 703 and executed by the CPU 702 to process the signal from the signal source 708. As such, the computer system 701 is a general-purpose computer system that becomes a specific purpose computer system when executing the routine 607 of the present invention.

The computer platform 701 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Having described embodiments for a system and method for curved planar reformation of image data, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer-implemented method for curved planar reformation of an image comprising:
   receiving a data volume including a medial axis tree of a vessel tree, wherein each medial axis of the medial axis tree bifurcates an area between adjacent branches of the vessel tree;
   determining a global rotation axis of the medial axis tree;
   casting a line segment from a vessel tree root of the medial axis tree into a predefined direction perpendicular to the global rotation axis;
   projecting the medial axis tree onto a reference plane along the line segment;
   re-sampling, from at least one medial axis point of a reference plane, the data volume using a vector perpendicular to a medial axis tangent of the reference plane, wherein the vector defines a sampling direction; and
   rendering an image of the vessel tree along the vector.

2. The computer-implemented method of claim 1, wherein determining a global rotation axis further comprises determining a center of gravity of the medial axis tree, wherein the global rotation axis passes through the center of gravity and the vessel tree root of the medial axis tree.

3. The computer-implemented method of claim 1, wherein projecting further comprises:
   determining values for each x-coordinate of the reference plane as a distance from a respective centerline point of the medial axis tree to the reference plane; and
   determining values for each y-coordinate of the reference plane as an absolute travel distance to the vessel tree root measured along the medial axes tree.

4. The computer-implemented method of claim 1, wherein rendering further comprises a partitioning of the projected medial axis tree along a plurality of parallel scan lines.

5. The computer-implemented method of claim 4, further comprising assigning a partition between each medial axis in the reference plane, the partition having an edge defined as an edge of the reference plane.

6. The computer-implemented method of claim 4, further comprising assigning a partition between each medial axis in the reference plane, the partition having an edge defined as a center point of a medial axis.

7. The computer-implemented method of claim 6, wherein each partition comprises a plurality of line sections, each line section being filled with voxel data obtained by scanning along a vector around an assigned line section.

8. The computer-implemented method of claim 1, wherein a length of the line segment is determined as a maximum distance among all medial axis tree points to the global rotation axis.

9. A non-transitory computer readable medium embodying instructions executable by a processor to perform a method for curved planar reformation of an image, the method steps comprising:
   receiving a data volume including a medial axis tree of a vessel tree, wherein each medial axis of the medial axis tree bifurcates an area between adjacent branches of the vessel tree;
   determining a global rotation axis of the medial axis tree;
   casting a line segment from a vessel tree root of the medial axis tree into a predefined direction perpendicular to the global rotation axis;
   projecting the medial axis tree onto a reference plane along the line segment;
   re-sampling, from at least one medial axis point of a reference plane, the data volume using a vector perpendicular to a medial axis tangent of the reference plane, wherein the vector defines a sampling direction; and
   rendering an image of the vessel tree along the vector.

10. The computer readable medium of claim 9, wherein determining a global rotation axis further comprises determining a center of gravity of the medial axis tree, wherein the global rotation axis passes through the center of gravity and the vessel tree root of the medial axis tree.

11. The computer readable medium of claim 9, wherein projecting further comprises:
   determining values for each x-coordinate of the reference plane as a distance from a respective centerline point of the medial axis tree to the reference plane; and
   determining values for each y-coordinate of the reference plane as an absolute travel distance to the vessel tree root measured along the medial axes tree.

12. The computer readable medium of claim 9, wherein rendering further comprises a partitioning of the projected medial axis tree along a plurality of parallel scan lines.

13. The computer readable medium of claim 12, wherein the method further comprises assigning a partition between each medial axis in the reference plane, the partition having an edge defined as an edge of the reference plane.

14. The computer readable medium of claim 12, wherein the method further comprises assigning a partition between each medial axis in the reference plane, the partition having an edge defined as a center point of a medial axis.

15. The computer readable medium of claim 14, wherein each partition comprises a plurality of line sections, each line section being filled with voxel data obtained by scanning along a vector around an assigned line section.

16. The computer readable medium of claim 9, wherein a length of the line segment is determined as a maximum distance among all medial axis tree points to the global rotation axis.

* * * * *